(12) United States Patent
Landis

(10) Patent No.: US 6,967,462 B1
(45) Date of Patent: Nov. 22, 2005

(54) CHARGING OF DEVICES BY MICROWAVE POWER BEAMING

(75) Inventor: Geoffrey A. Landis, Berea, OH (US)

(73) Assignee: NASA Glenn Research Center, Cleveland, OH (US)

( * ) Notice: Subject to any disclaimer, the term of this patent is extended or adjusted under 35 U.S.C. 154(b) by 149 days.

(21) Appl. No.: 10/455,139

(22) Filed: Jun. 5, 2003

(51) Int. Cl.$^7$ .............................................. H01M 10/46
(52) U.S. Cl. ........................ 320/101; 320/109; 322/2 R
(58) Field of Search ................................ 320/101, 106, 320/110, 108, 109; 322/2 R

(56) References Cited

U.S. PATENT DOCUMENTS

| | | |
|---|---|---|
| 3,971,454 A | 7/1976 | Waterbury |
| 3,989,994 A | 11/1976 | Brown |
| 4,685,047 A | 8/1987 | Phillips, Sr. |
| 5,210,804 A | 5/1993 | Schmid |
| 5,260,639 A | 11/1993 | De Young et al. |
| 5,396,538 A | 3/1995 | Hong |
| 5,503,350 A | 4/1996 | Foote |
| 5,733,313 A | 3/1998 | Barreras, Sr. et al. |
| 5,982,139 A | 11/1999 | Parise |
| 6,114,834 A | 9/2000 | Parise |
| 6,127,799 A | 10/2000 | Krishnan |
| 6,239,879 B1 | 5/2001 | Hay |
| 6,310,960 B1 | 10/2001 | Saaski et al. |
| 6,474,341 B1 | 11/2002 | Hunter et al. |
| 6,489,745 B1 | 12/2002 | Koreis |
| 6,498,455 B2 | 12/2002 | Zink et al. |
| 2002/0027390 A1 | 3/2002 | Ichiki et al. |

OTHER PUBLICATIONS

Prado, Mark "Environmental Effects—The PowerSat Beam and the Environment" 1983 P.E.R.M.A.N.E.N.T.

*Primary Examiner*—Edward H. Tso

(57) ABSTRACT

A system for providing wireless, charging power and/or primary power to electronic/electrical devices is described whereby microwave energy is employed. Microwave energy is focused by a power transmitter comprising one or more adaptively-phased microwave array emitters onto a device to be charged. Rectennas within the device to be charged receive and rectify the microwave energy and use it for battery charging and/or for primary power. A locator signal generated by the device to be charged is analyzed by the system to determine the location of the device to be charged relative to the microwave array emitters, permitting the microwave energy to be directly specifically towards the device to be charged. Backscatter detectors respond to backscatter energy reflected off of any obstacle between the device to be charged and the microwave array emitters. Power to any obstructed microwave array emitter is reduced until the obstruction is removed. Optionally, data can be modulated onto microwave energy beams produced by the array emitters and demodulated by the device, thereby providing means of data communication from the power transmitter to the device. Similarly, data can be modulated onto the locator signal and demodulated in the power transmitter, thereby providing means of data communication from the device to the power transmitter.

20 Claims, 4 Drawing Sheets

CHARGING OF DEVICES BY MICROWAVE POWER BEAMING

ORIGIN OF THE INVENTION

The invention described herein was made by an employee of the United States Government and may be manufactured and used by or for the Government for Government purposes without the payment of any royalties thereon or therefore.

TECHNICAL FIELD

The present invention relates generally to wireless charging and powering of battery-powered electrical/electronic devices, including consumer devices.

BACKGROUND ART

A recent trend in consumer electronic devices is small, battery operated devices with on-board rechargeable batteries that are recharged by using a small, external charging adapter. These consumer devices can be, e.g., cell phones, personal digital assistants (PDAs), personal stereo devices (e.g., "Walkman", or MP3 Player), laptop computers, calculators, pagers, etc. Typically, the charging adapters for these devices are wall-plug AC adapters that provide bulk, low-voltage AC or DC charging power to the consumer device for operating the device and/or charging the device's on-board battery. Often, cigarette lighter adapters and similar charging adapters are provided for charging the consumer devices from a car's electrical system.

A typical consumer device charging system comprises a source of charging power, a charging circuit and a rechargeable battery. The charging circuit typically controls the amount of charging current delivered to the consumer device's battery, sensing and adjusting the current according to the battery's state of charge. Often, such charging circuits provide additional power for operating the consumer device while it is connected to charging adapter, dividing available power between battery charging and device operation as required.

Sometimes the charging circuit resides within the consumer device; other times the charging circuit is built into the charging adapter. The practice of putting the charging circuit into the charging adapter can be particularly advantageous for very small consumer devices, as it eliminates circuitry from the consumer device itself. Although such charging circuits are typically very small themselves, they can be large in comparison to other circuitry in consumer devices and the space saved by eliminating them can have a significant effect on the size, complexity and cost of the consumer device.

Usually, the charging adapter plugs into the consumer device by means of a wired connection. Sometimes, a connector or a set of contacts on the exterior of the consumer device is arranged so that the act of placing it into a charging "cradle" establishes a physical/electrical connection for charging the device. In this case, the "cradle" is a part of the charging adapter. Most charging systems for consumer devices require a direct electrical connection of this type between the device to be charged and the charging adapter. Over time, these contacts can become worn, loose or dirty, compromising their physical and/or electrical integrity and making them unreliable.

One scheme for powering and/or charging electrical/electronic devices involves electromagnetically coupled coils. A first coil (or antenna) is disposed within a charging apparatus. A second coil (or antenna) is disposed within the device to be charged. A "transmitting" circuit drives the first coil with an AC waveform. The device to be charged is placed in close proximity to the charging apparatus such that an electro-magnetic field produced by the first coil induces a corresponding AC electrical signal in the second coil. By rectifying the electrical signal in the second coil, a source of charging energy for the device to be charged is realized. In effect, the two coils (or antennae) form a transformer by which electrical power and/or signals can be communicated between the charging apparatus and the device to be charged. Such non-contacting charging systems have also been adapted to provided data communication over the same electro-magnetic coupling that provides the charging energy by modulating the charging signal and/or load impedance.

SUMMARY OF THE INVENTION

The present inventive technique provides for wireless, charging power and/or primary power to electronic/electrical devices whereby microwave energy is employed. The microwave energy is focused by one or more adaptively-phased microwave array emitters in a power transmitter portion of the system onto a device to be charged. Rectennas within the device to be charged receive and rectify the microwave energy and use it for battery charging and/or for primary power. A locator signal generated by the device to be charged is analyzed by the system to determine the location of the device to be charged relative to the microwave array emitters, permitting the microwave energy to be directly specifically towards the device to be charged. Backscatter detectors respond to backscatter energy reflected off of any obstacle between the device to be charged and the microwave array emitters. Power to any obstructed microwave array emitter is reduced until the obstruction is removed. Optionally, data can be modulated onto microwave energy beams produced by the array emitters and demodulated by the device, thereby providing means of data communication from the power transmitter to the device. Similarly, data can be modulated onto the locator signal and demodulated in the power transmitter, thereby providing means of data communication from the device to the power transmitter.

The power transmitter portion of the system includes one or more (preferably planar) adaptively-phased microwave array emitters, and location detection means responsive to the location signal generated by the device to be charged. Typically, the array emitters would be mounted to walls and or floors of a room in which the device to be charged resides. The phase of microwave energy produced by the array emitters is continuously varied across the face(s) of the array emitter(s) to produce the effect of a focused beam of microwave energy, converging at the device. One or more rectennas within the device receive the transmitted microwave energy, converting and rectifying it into DC electrical energy useful for battery charging and/or device power.

According to an aspect of the invention, device location is determined by producing "pilot beams" (locator signal) at the location of the device to be charged to be received by the power transmitter. By analyzing timing characteristics of the received signal (e.g., by triangulation) the power transmitter determines the exact location of the device to be charged relative to its array emitters and adjusts phase of the microwave energy across the surface of the array emitters to focus the energy on the device.

According to another aspect of the invention, the array emitters produce continuous-wave microwave energy in the frequency range between 2 GHz and 10 GHz inclusive. Frequencies higher than 10 GHz can be employed (e.g., millimeter wave), but using current rectenna technology, there would be a loss of efficiency.

According to another aspect of the invention, each individual microwave array emitter produces energy at a frequency close to, but different from that produced by any other microwave array emitter in the system. This reduces loss of energy in sidelobes, and minimizes interference issues.

According to another aspect of the invention, the power transmitter includes backscatter detectors for detecting backscatter energy reflected off of any obstruction between the microwave array emitters and the device to be charged. When an obstruction is detected, the obstructed, the power output of the obstructed microwave array emitter is reduced to a low level until the obstruction is removed, thereby reducing lost power and preventing injury to humans or damage to objects that obstruct the power transmission path between the arrays and the device.

According to another aspect of the invention, conventional electrical/electronic devices (i.e., those not specifically adapted to microwave charging) can be accommodated by means of a microwave charging adapter/cradle that embodies the inventive technique for receiving and converting microwave energy. In this case, the charging cradle/adapter would generate the locator signal and receive the microwave energy.

According to another aspect of the invention, data can be modulated onto the microwave energy produced by the adaptively phased microwave array emitters by means of a modulator function, thereby producing microwave energy beams having a (DC) power component and a (AC) data component. A demodulator function in the device (or charging adapter/cradle) demodulates the data component of the microwave energy beam as received by the rectennas. This provides means of communicating data from the power transmitter to the device.

According to another aspect of the invention, data can be modulated onto the locator signal produced by the device to be charged (or by the charging cradle/adapter) by means of a modulator function. A corresponding demodulator function in the power transmitter demodulates the data modulated onto the locator signal, thereby providing means of communicating data from the device to the power transmitter.

BRIEF DESCRIPTION OF THE DRAWINGS

These and further features of the present invention will be apparent with reference to the following description and drawing, wherein.

DETAILED DESCRIPTION OF THE INVENTION

The present inventive technique provides for charging and/or powering of an electrical/electronic device using microwave energy. One or more adaptive-phased arrays are used to focus one or more "rectennas" (rectifying antennas) disposed within the consumer device. Microwave energy reaching the rectenna(s) is converted into DC electrical energy that is used to charge a battery or other energy storage device within the consumer device. The DC electrical energy can also be used to provide primary power for the consumer device while the battery or storage device is being charged.

Figure 1A:
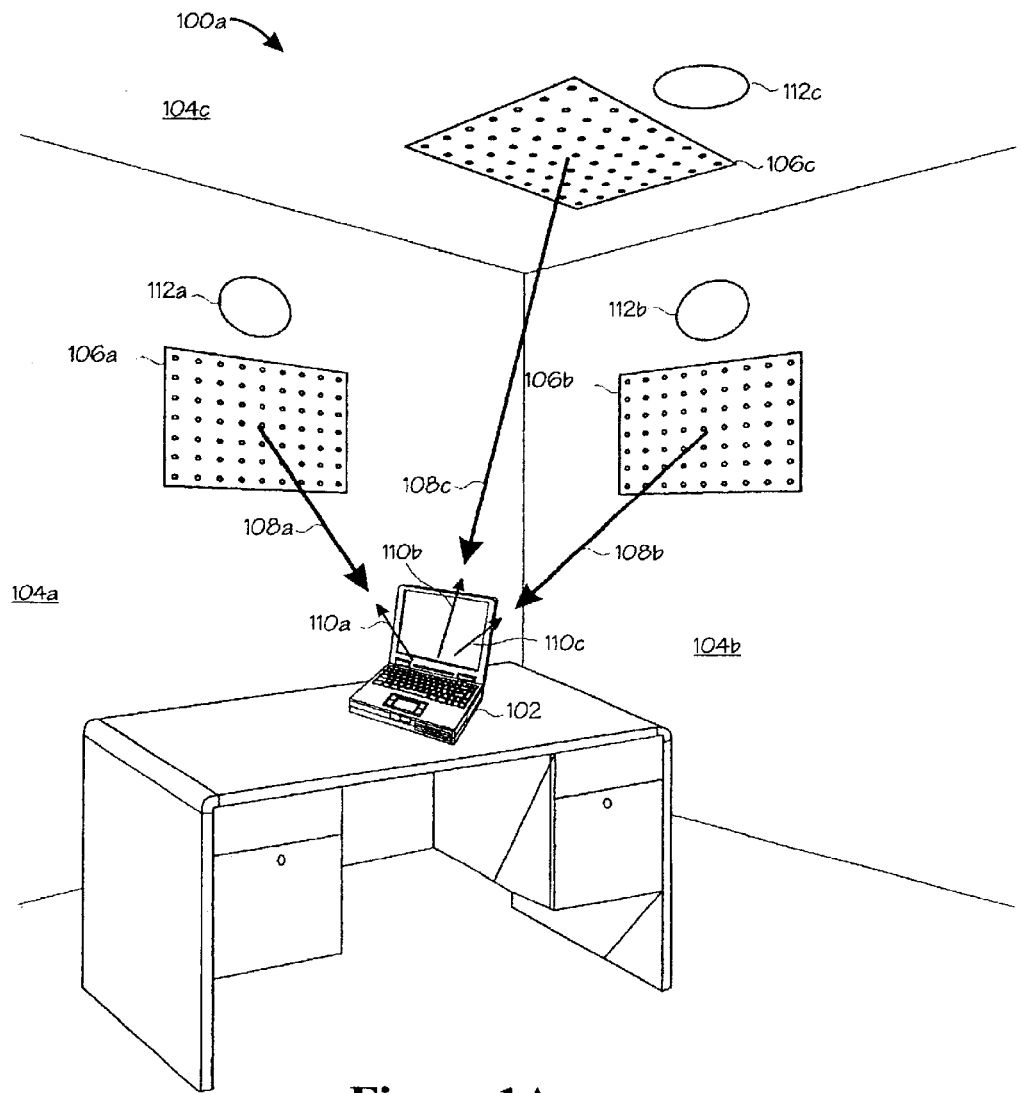
FIG. 1A is a view of a system for direct microwave charging of an electrical/electronic device, in accordance with the invention.

FIG. 1A is a view of a system 100a for direct microwave charging of an electrical/electronic device 102, wherein a plurality of adaptive-phased array microwave emitters 106a, 106b and 106c are disposed on walls 104a, 104b and ceiling 104c, respectively of a room in which the electrical/electronic device 102 resides. Pilot beams 100a, 100b, 110c from the electrical/electronic device 102 permit the system 100 to determine the exact location of the electrical/electronic device 102 within the room. Each of the adaptive-phased arrays 106a, 106b and 106c is then driven to emit continuous-wave microwave energy with varying phase across the array surface in order to effectively focus a respective beam 108a, 108b, 108c of microwave energy directly at the electrical/electronic device 102. One or more rectennas (described in greater detail hereinbelow) within the electrical/electronic device 102 receive the microwave energy focused thereupon and convert it into a source of charging and/or operating power therefor. Backscatter detectors 112a, 112b and 112c, mounted in close proximity to adaptive-phased arrays 106a, 106b and 106c, respectively, detect "backscatter", i.e., microwave energy reflected off of any obstacle (e.g., a human) that might enter the beam path. When significant backscatter is detected by one of the backscatter detectors 112a, 112b or 112c, its respective adaptive-phased array 112a is either turned off completely or reduced to a low level of power emission until the beam is clear of the obstruction. This prevents transmission of wasted microwave power that will not reach the electrical/electronic device 102, and also guards against injury or damage to a human (or other obstacle) that enters a beam path. If any beam is obstructed (108a, 108b or 108c), the remaining beams can still power the electrical/electronic device 102.

Preferably, the adaptive-phased arrays operate in the range of 2 to 10 GHz ($2 \times 10^9$ Hz to $10 \times 10^9$ Hz). Higher frequencies, e.g., "millimeter wave" frequencies can be employed, but current millimeter wave rectenna technology is lower in efficiency than rectenna technology designed for the 2 to 10 GHz range. It is also preferable that the adaptive phase arrays (106a, 106b and 106c) operate at slightly different frequencies, i.e., it is preferable that the adaptive-phased arrays 106a, 106b, 106c transmit mutually incoherent microwave signals. While having all of the adaptive-phased arrays operate on the same frequency would result in a smaller beam "spot" (focal point) on the electrical/electronic device to be charged/powered, it would also result in more of the beam power being scattered into sidelobes, yielding lower efficiency (wasted power in the sidelobes) and greater interference between arrays.

The "pilot beams" 110a, 110b and 110c are essentially a locator signal, and can be provided by any suitable means of identifying the location of the electrical/electronic device 102 relative to the adaptive-phased arrays 106a, 106b and 106c. This can be an RF signal, a microwave signal, or any other suitable locator signal from which the location of the electrical/electronic device 102 can be determined by the system 100a.

Data transfer between the charging system 100a and the electrical/electronic device 102 is readily accomplished by modulating data onto one or more of the charging beams 108*a*, 108*b*, 108*c*, and demodulating the modulated component in the electrical/electronic device. Similarly, the electrical/electronic device 102 can modulate either one or more of its pilot beams 110*a*, 110*b* or 110*c* (or whatever "locator" signal it employs) with data to be transferred to the system 100*a*. This data transfer mechanism is described in greater detail hereinbelow with respect to FIG. 2B.

Figure 1B:
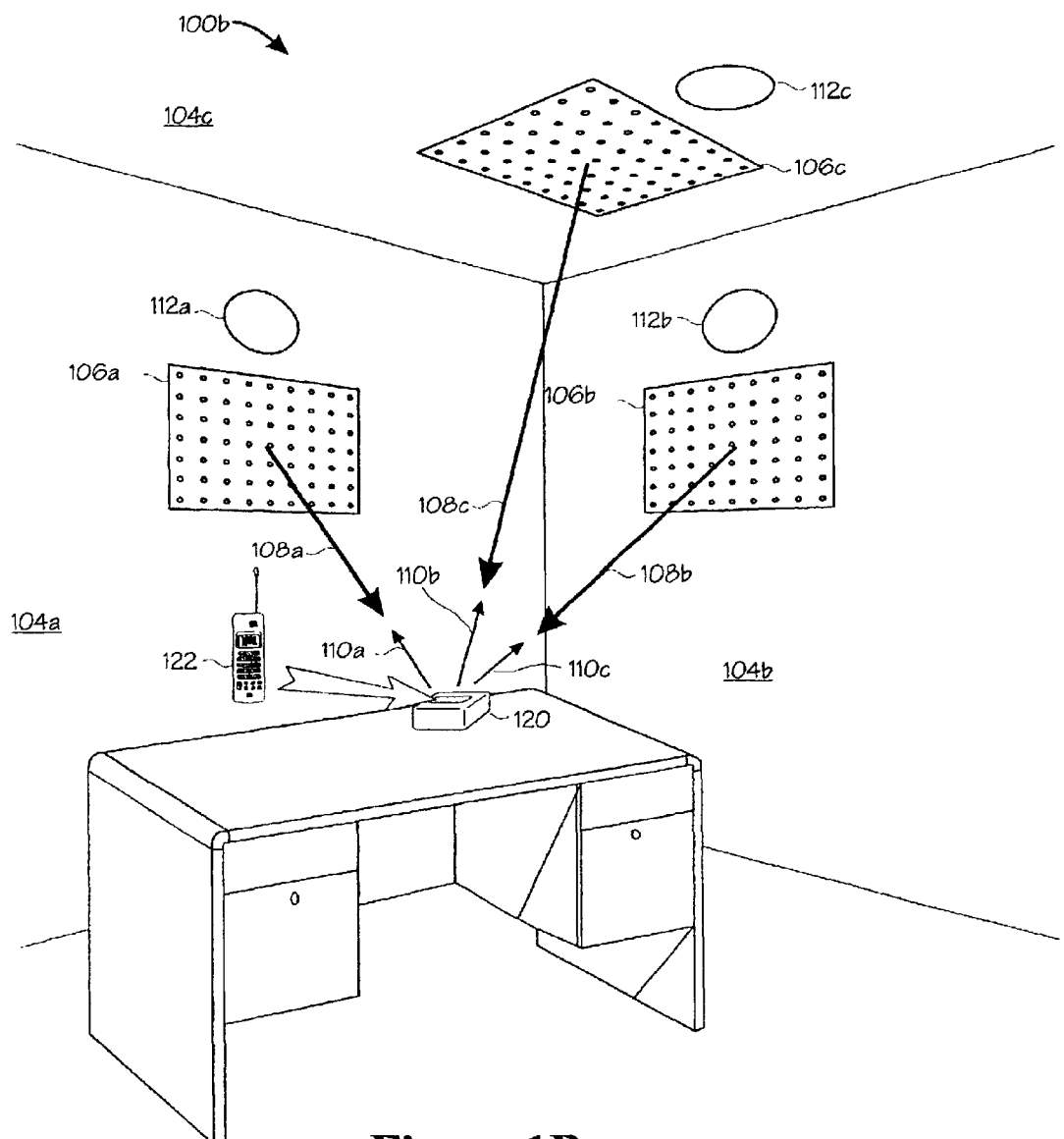
FIG. 1B is a view of a system for microwave charging of an electrical/electronic device in a charging cradle, in accordance with the invention.

FIG. 1B is a view of a similar system 100*b* for microwave charging of an electrical/electronic device 122 in a charging cradle/adpater 120. This embodiment is essentially identical to that of FIG. 1A, except that the electrical/electronic device 102 of FIG. 1A had the beam-receiving rectennas and pilot beam generation built-in, while the implementation of FIG. 1B separates the beam-receiving rectennas and pilot beam generation into a separate charging cradle/adapter 120. In effect, the combination of electrical/electronic device 122 and charging cradle/adapter 120 in FIG. 1B is comparable to the electrical/electronic device 102 of FIG. 1A. Pilot beams 110*a*, 110*b*, and 110*c* can be "gated" such that they are only generated when the electrical/electronic device 122 is "docked" in its charging cradle/adapter 120, thereby signaling to the system 100*b* that the adaptive-phased arrays can be powered down, since there is no need for powering/charging otherwise.

One advantage of the system 100*a* of FIG. 1A over the system 100*b* of FIG. 1B is that the fully-integrated electrical/electronic device 102 required no charging adapter, and can be charged or powered simply by being placed in the vicinity of a suitable charging system. The system 100*b* of FIG. 1B has the advantage that it readily adapted to accept existing electrical/electronic devices such as cell phones and PDAs without modification.

Figure 2A:
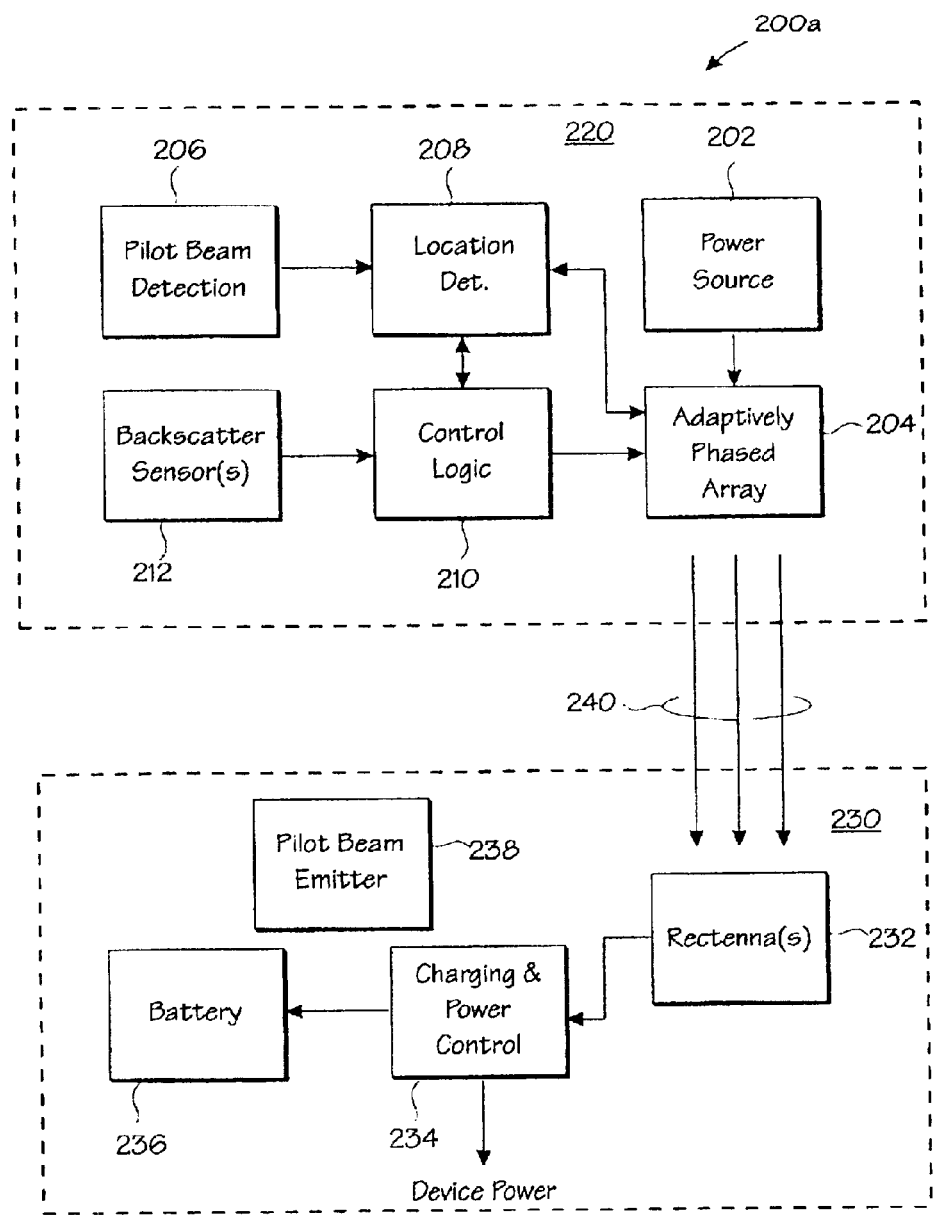
FIG. 2A is a block diagram of a system for microwave charging, in accordance with the invention.

FIG. 2A is a block diagram of a system 200*a* for microwave charging an electrical/electronic device 230 by means of focused, microwave beams 240. A power transmitter portion 220 of the system comprises a power source 202 that powers one or more adaptively-phased arrays 204 to produce one or more directed ("focused") beams 240 of microwave energy aimed at the electrical/electronic device 230. Pilot beam detection 206, detects a locator signal emitted by a pilot beam emitter 238 in the electrical/electronic device. A location detection function 208 analyzes the timing of the locator signal to determine the location of the electrical/electronic device 230 relative to the one or more adaptively-phased arrays 204. The phase of transmitted microwave energy is varied continuously across the face of the adaptively-phased arrays 204 to produce beam(s) 240 that converge on one or more rectenna elements 232 in the electrical/electronic device. Microwave energy received by the rectennas 232 is rectified and converted thereby into DC electrical energy which is in turn presented to a charging and power control function block 234 for charging a battery 236 and/or for providing primary power to the electrical/electronic device 230.

Backscatter sensors 212 in the power transmitter portion 220 detect reflected microwave energy indicative of an obstacle in the microwave beams. Control logic responds to signal from the backscatter detector and reduces (or cuts off) the power transmitted by any adaptively-phased array 204 whose beam path is obstructed. Preferably, the power of the obstructed beam is lowered to a "safe" level and the backscatter detectors are continually monitored to determine when the beam is clear, at which time full power to the affected beam can once again be restored. Additionally, the location detection function 208 can provide an indication of presence or absence of an electrical/electronic device 230 to be charged, enabling power transmission by the adaptively-phased arrays 204 only when an appropriately adapted electrical/electronic device 230 is present.

Figure 2B:
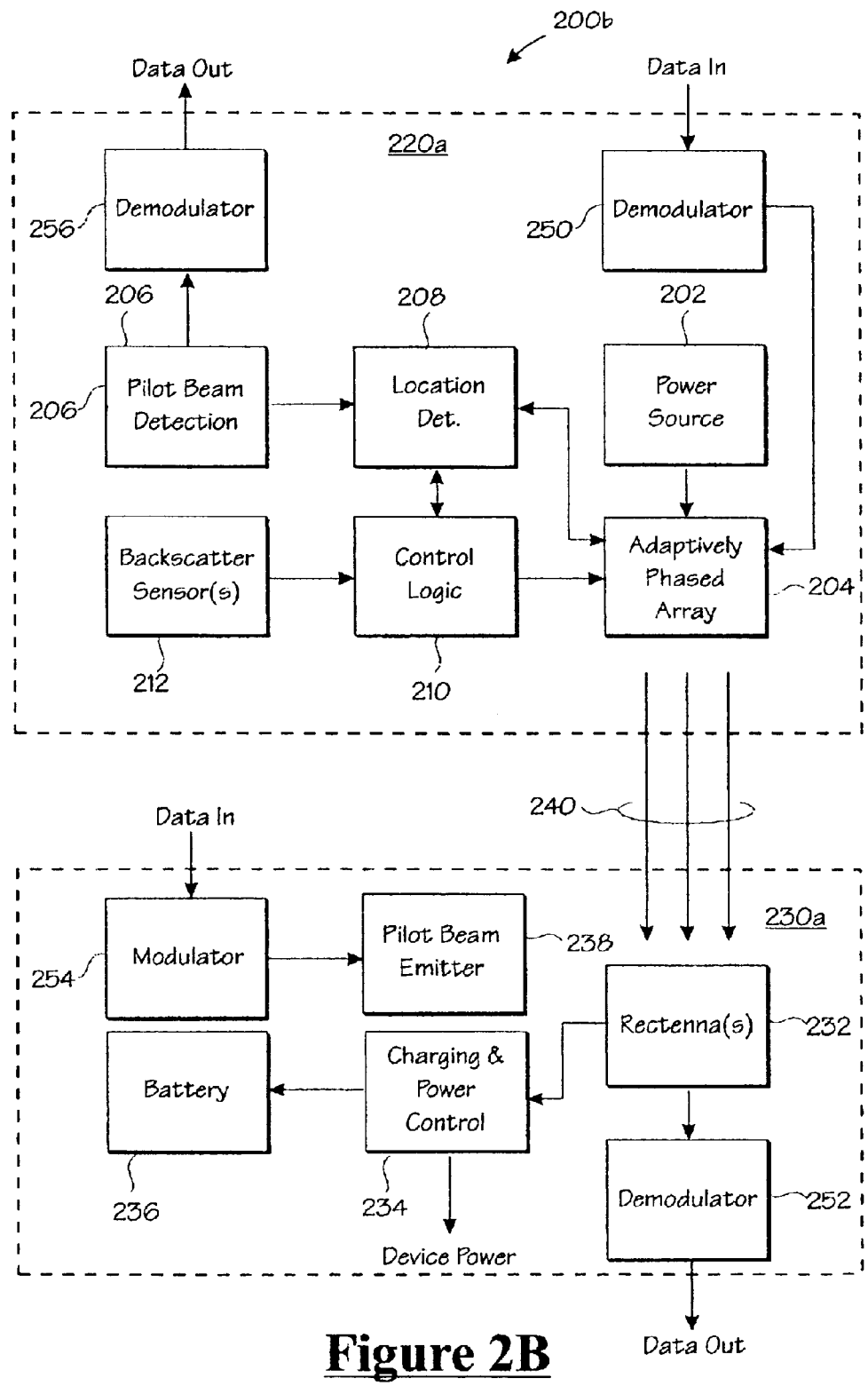
FIG. 2B is a block diagram of a system for microwave charging, including means for data exchange, in accordance with the invention.

FIG. 2B is a block diagram of a similar system 200*b* for microwave charging of an electrical/electronic device 230*a* (compare 230) by a power transmitter portion 220*a* (compare 220) of the system, but adding means for data exchange between the electrical/electronic device 230*a* and the power transmitter portion 220*a* As in the system 200 of FIG. 2A, the power transmitter portion 220*a* of the system comprises a power source 202 that powers one or more adaptively-phased arrays 204 to produce one or more directed ("focused") beams 240 of microwave energy aimed at the electrical/electronic device 230*a*. In addition, however, a Modulator function 250 modulates the microwave energy generated by the adaptively phased arrays 204 such that the focused power beams 240 carry both power (a "DC" or continuous beam component) and data (an "AC" or varying beam component). A demodulator function 252 in the electrical/electronic device 230*a* demodulates or "decodes" the varying beam component as received by the rectennas 232, and reproduces the data used to produce the modulation.

Pilot beam detection 206, detects a locator signal emitted by a pilot beam emitter 238 in the electrical/electronic device 230*a* In this case, however, a modulator function 254 modulates data onto the locator signal produced by the pilot beam emitter. A demodulator function 256 in the power transmitter portion 220*a* decodes (demodulates) the data modulated onto the locator signal. A location detection function 208 analyzes the overall timing of the locator signal to determine the location of the electrical/electronic device 230*a* relative to the one or more adaptively-phased arrays 204. The phase of transmitted microwave energy is varied continuously across the face of the adaptively-phased arrays 204 to produce beam(s) 240 that converge on one or more rectenna elements 232 in the electrical/electronic device. Microwave energy received by the rectennas 232 is rectified and converted thereby into DC electrical energy which is in turn presented to a charging and power control function block 234 for charging a battery 236 and/or for providing primary power to the electrical/electronic device 230*a*.

As in the system 200 of FIG. 2A, backscatter sensors 212 in the power transmitter portion 220*a* detect reflected microwave energy indicative of an obstacle in the microwave beams. Control logic responds to signal from the backscatter detector and reduces (or cuts off) the power transmitted by any adaptively-phased array 204 whose beam path is obstructed. Preferably, the power of the obstructed beam is lowered to a "safe" level and the backscatter detectors are continually monitored to determine when the beam is clear, at which time full power to the affected beam can once again be restored. Additionally, the location detection function 208 can provide an indication of presence or absence of an electrical/electronic device 230*a* to be charged, enabling power transmission by the adaptively-phased arrays 204 only when an appropriately adapted electrical/electronic device 230*a* is present.

Those of ordinary skill in the art will immediately understand that the electronic/electronic device 230 of FIG. 2A could be charged by the power transmitter portion 220*a* of FIG. 2B, but that there would be no data exchange capability due to the lack of compatible data exchange circuitry in the electrical/electronic device 230. Similarly, the electrical/electronic device 230*a* of FIG. 2B could be charged by the power transmitter 220 of FIG. 2A, but there would be no data exchange capability due to the lack of compatible data exchange circuitry in the power transmitter 220.

Those of ordinary skill in the art will immediately understand that the systems 200 and 200a of FIGS. 2A and 2B, respectively, can be applied either to fully-integrated, microwave-chargeable electrical/electronics devices (e.g., 102, FIG. 1A) or to microwave charging stations for conventional electrical/electronic devices (e.g., 122, 120, FIG. 1B) by making the appropriate functional divisions. Specifically, only the battery (e.g., 236, FIG. 2B) need reside within a conventional electrical/electronic device (e.g., 122, FIG. 1B). All other components of the microwave-chargeable electrical electronic device (see 230, 230a, FIGS. 2A, 2B) can be integrated into a charging station (e.g., 120 FIG. 1B).

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A system for charging of devices, comprising:
    a power transmitter having a plurality of adaptively-phased microwave array emitters;
    a device to be charged having one or more rectennas associated therewith; and
    location determining means for determining a location of the device to be charged relative to the adaptively-phased array emitters;
    wherein each individual microwave array emitter produces energy at a frequency close to, but different from that produced by any other microwave array emitter in the system.

2. A system according to claim 1, further comprising:
    means for exchanging data between the power transmitter and the device to be charged.

3. A system according to claim 2, further comprising:
    modulating means for modulating a data signal onto a locator signal produced by the device to be charged; and
    demodulating means within the power transmitter for demodulating the data modulated onto the locator signal.

4. A system for charging of devices, comprising:
    a power transmitter having one or more adaptively-phased microwave array emitters;
    a device to be charged having one or more rectennas associated therewith;
    location determining means for determining a location of the device to be charged relative to the adaptively-phased array emitters; and
    one or more backscatter detectors associated with the adaptively-phased microwave array emitters for detecting microwave backscatter energy reflected off of any obstruction between the adaptively-phased microwave array emitters and the device to be charged.

5. A system according to claim 4, wherein:
    the location determining means are employed to focus energy produced by the adaptively-phased microwave array emitters onto the device to be charged.

6. A system according to claim 4, wherein:
    the location determining means further comprise:
    a pilot beam emitter in the device to be charged for producing a locator signal;
    a pilot beam detector in the power transmitter for detecting the locator signal; and
    location detection means for analyzing the locator signal to determine the location of the device to be charged.

7. A system according to claim 4, wherein:
    the adaptively-phased microwave array emitters produce continuous-wave microwave energy in the frequency range between 2 GHz and 10 GHz inclusive.

8. A system according to claim 4, wherein:
    each separate adaptively-phased microwave array emitter produces microwave energy at a unique frequency close to but different from the frequency produced by any other adaptively-phased microwave array emitter in the system.

9. A system according to claim 4, further comprising:
    means for reducing power transmitted by any adaptively-phased microwave array emitter for which an obstruction exists between it and the device to be charged.

10. A system according to claim 9, further comprising:
    means for restoring full power to the obstructed adaptively-phased microwave array emitter upon removal of the obstruction.

11. A system according to claim 4, wherein:
    the device to be charged is connected to a charging cradle/adapter within which the rectennas are disposed that receives microwave energy transmitted by the one or more adaptively-phased microwave array emitters and transfers it to the device to be charged.

12. A system according to claim 4, further comprising:
    means for exchanging data between the power transmitter and the device to be charged.

13. A system according to claim 12, wherein:
    the location determining means are employed to focus energy produced by the adaptively-phased microwave array emitters onto the device to be charged.

14. A system according to claim 12, wherein:
    the location determining means further comprise:
    a pilot beam emitter in the device to be charged for producing a locator signal;
    a pilot beam detector in the power transmitter for detecting the locator signal; and
    location detection means for analyzing the locator signal to determine the location of the device to be charged.

15. A system according to claim 12, further comprising:
    means for reducing power transmitted by any adaptively-phased microwave array emitter for which an obstruction exists between it and the device to be charged.

16. A system according to claim 15, further comprising:
    means for restoring full power to the obstructed adaptively-phased microwave array emitter upon removal of the obstruction.

17. A system according to claim 12, further comprising:
    modulating means for modulating data onto microwave energy beams produced by the one or more adaptively-phased microwave array emitters; and demodulating means for demodulating the data modulated onto the microwave energy beams.

18. A system according to claim 17, wherein:

the rectennas and demodulating means reside within the device to be charged.

19. A system according to claim 17, wherein:

the rectennas and demodulating means reside within a charger adapter/cradle to which the device to be charged is connected, the device to be charged is situated in a charging cradle/adapter that receives microwave energy transmitted by the one or more adaptively-phased microwave array emitters and transfers it to the device to be charged.

20. A system for device charging, comprising:

a power transmitter portion further comprising:

a power source;

one or more adaptively-phased microwave array emitters;

means for receiving a location signal indicative of the location of a device to be charged;

location detection means for determining the location of the device to be charged from the locator signal;

means for focusing energy produced by the one or more adaptive-phase microwave array emitters onto the devices to be charged; and control logic means for reducing the amount of energy produced by any obstructed adaptively phased microwave array emitter until the obstruction is removed; and a device to be charged comprising:

a battery;

one or more rectennas for receiving and rectifying energy produced by the adaptively-phased microwave array emitters; and charging and power control means for charging the battery from rectified energy received by the rectennas.

* * * * *

UNITED STATES PATENT AND TRADEMARK OFFICE
CERTIFICATE OF CORRECTION

PATENT NO. : 6,967,462 B1
DATED : November 22, 2005
INVENTOR(S) : Landis

It is certified that error appears in the above-identified patent and that said Letters Patent is hereby corrected as shown below:

Column 10,
Line 3, after "means for focusing energy produced by the one or more adaptively-phased microwave array emitters onto the device to be charged;" insert the following paragraph: -- backscatter detection means for detecting microwave energy reflected off of any obstruction between the one or more adaptively-phased microwave array emitters and the device to be charged; and --.

Signed and Sealed this

Twenty-eighth Day of February, 2006

JON W. DUDAS
*Director of the United States Patent and Trademark Office*